United States Patent [19]
Albanese et al.

[11] Patent Number: 4,712,859
[45] Date of Patent: Dec. 15, 1987

[54] DISTRIBUTED STAR NETWORK

[75] Inventors: Andres Albanese, Morristown; Steven S. Cheng, Bernards Township, Somerset County, both of N.J.

[73] Assignee: Bell Communications Research, Inc., Livingston, N.J.

[21] Appl. No.: 777,953

[22] Filed: Sep. 19, 1985

[51] Int. Cl.⁴ .................... G02B 6/28; H04B 9/00
[52] U.S. Cl. .................... 350/96.16; 350/96.15; 370/3; 455/612
[58] Field of Search ............... 350/96.15, 96.16, 96.20, 350/96.29; 370/1, 3, 4; 455/606, 607, 612

[56] References Cited

U.S. PATENT DOCUMENTS

| | | | |
|---|---|---|---|
| 2,345,445 | 3/1944 | Atwood | 250/7 |
| 3,532,890 | 10/1970 | Denton | 250/199 |
| 3,584,220 | 6/1971 | Nomura et al. | 250/199 |
| 3,756,690 | 9/1973 | Borrelli et al. | 350/96.29 |
| 3,995,155 | 11/1976 | Hutcheson et al. | 250/227 |
| 4,090,067 | 5/1978 | Bell et al. | 455/607 |
| 4,165,225 | 8/1979 | Auracher et al. | 65/4 B |
| 4,186,380 | 1/1980 | Edwin et al. | 455/612 |
| 4,195,269 | 3/1980 | Ettenberg et al. | 455/612 |
| 4,317,614 | 3/1982 | Palmer | 350/96.16 |
| 4,326,298 | 4/1982 | Fromm et al. | 455/606 |
| 4,525,873 | 6/1985 | Baues | 455/600 |
| 4,554,449 | 11/1985 | Taniuchi et al. | 350/96.13 X |
| 4,630,883 | 12/1986 | Taylor et al. | 350/96.16 X |

FOREIGN PATENT DOCUMENTS

| | | | |
|---|---|---|---|
| 0105753 | 4/1984 | European Pat. Off. | 455/612 |
| 53-441104 | 4/1978 | Japan | 455/612 |

OTHER PUBLICATIONS

"Star Network with Collision-Avoidance Circuits by Albanese pp. 631-638, The Bell System Technical Journal, Mar. 1983.
Kishimoto, "Optical Coupler for Laser Redundancy System", Electronic Letters, Jan. 4, 1982, vol. 18, p. 140.
Cheng, et al., "Subscriber Loop Architecture", AT&T Technical Digest, Sep. 1984, No. 75, pp. 9-10.
Gould Electronics Bulletin GD-11, Coupler Specifications-Update, Jun. 1984, Defense Electronics Division.
Kaiser, et al., "Two-Channel Single-Mode WDM in the 1.3 Micron Wavelength Region", in the Proceedings of the Integrated Optics and Optical Communications Conference in Tokyo, Jun. 1983, p. 272.
Lasertron Publication Q-DF-T Transimpedance pin-FET Detector Module.
General Optronics Corp. Publication, GO-PIN FET Specification, 1982.
Lasertron Publication, QLM—1300-AM-BH 1300 nm Laser Module with Single Mode Fiber.
Uirich, "Polarization Stabilization on Single-Mode Fiber", Appl. Phys. Lett. vol. 35, No. 11, Dec. 1, 1979, pp. 840-842.
Albanese, "Star Network with Collision-Avoidance Circuits", Bell System Technical Journal, vol. 62, No. 3, Mar. 1983, pp. 631-638.
Metcalfe et al., "Ethernet: Distributed Packet Switching for Local Computer Networks", Communications of the ACM, Jul. 1976, vol. 19, No. 7, pp. 395-404.
Abramson, "The Throughput of Packet Broadcasting Channels", IEEE Trans. on Communications, Jan. 1977, ol. COM. 25, No. 1, pp. 117-127.
Limb, et al., "Description of Fasnet-A Unidirectional Local-Area Communications Network", vol. 61, No. 7, Sep. 1982, pp. 1413-1440.
D. C. Gloge, et al., D. S. Larner, et al., Feb. 12, 1985, Conference Proceedings.

Primary Examiner—William L. Sikes
Assistant Examiner—Akm E. Ullah
Attorney, Agent, or Firm—James W. Falk

[57] ABSTRACT

A distributed star network for providing point-to-point and broadcast-type communication among a plurality of user stations is disclosed. The distributed star network is implemented using single mode optical technology including single mode lasers and single mode optical fibers.

13 Claims, 4 Drawing Figures

DISTRIBUTED STAR NETWORK

FIELD OF THE INVENTION

This invention relates to an optical communications network and more particularly to a short haul communications network which has a distributed star architecture.

BACKGROUND OF THE INVENTION

In the first generation of single mode optical transmission networks, low loss single mode optical fibers were deployed in point to point links with directly modulated single mode lasers. A laser is directly modulated when its drive current is directly subjected to a modulating signal. For intercity transmissions where long repeater spacing and high bit rate communications are of primary concern, this is an effective and efficient use of single mode technology. However, for short haul communications, the typical distance between a central office or other communications center and a user station is much shorter than the maximum available repeater spacing. In this environment, the use of a directly modulated laser for each communication link between a central office and an end user represents a considerable waste of laser power.

One way to more efficiently use single mode lasers and single mode optical fibers in a short haul system is to share a single laser among a plurality of communications links. Laser sharing schemes for use in single mode short haul optical transmission systems are disclosed in U.S. patent application Ser. No. 680,398 filed on behalf of S. S. Cheng, J. Lipson, and S. D. Personick, now U.S. Pat. No. 4,658,394, issued Apr. 14, 1987, U.S. patent application Ser. No. 732,556 filed on behalf of S. D. Personick, now U.S. Pat. No. 4,642,804, issued Feb. 10, 1987, and U.S. patent application Ser. No. 777,952 filed on behalf of S. S. Cheng on even date herewith. All of the aforementioned applications are assigned to the assignee hereof and are incorporated herein by reference.

The systems described in the above-mentioned patent applications utilize single mode technology including single mode lasers and single mode optical fibers, to transmit information from a central office to a plurality of user stations and from a user station back to the central office. However, none of these applications deal with the problem of how to establish a network which will enable communication between pairs of user stations and which will enable a single user station to broadcast information to a plurality of other user stations.

Accordingly, it is an object of the present invention to provide a short haul optical communication system using single mode technology which permits point to point connections between pairs of user stations and which permits a single user station to broadcast information to a plurality of other user stations. Such a network will be useful in a local access and transport area (LATA) or a local area network (LAN).

SUMMARY OF THE INVENTION

The present invention is a short haul optical communications network which uses single mode technology to provide point to point connections between pairs of user stations and which permits a single user station to broadcast information to a plurality of other user stations. The network of the present invention is essentially a distributed star network which is implemented using single mode technology including single mode lasers and single mode optical fibers.

More particularly, in a particular embodiment of the invention, continuous wave radiation is transmitted from a laser located in a central office over a plurality of single mode optical fibers to a plurality of user stations. Each user station includes a modulator device so that information can be modulated on the radiation transmitted thereto from the central office. The radiation transmitted to the user stations is then transmitted back to the central office.

A hub element at the central office receives the radiation from each of the user stations and optically rebroadcasts to all user stations information modulated onto the radiation at any one user station. Use of an appropriate packet switching protocol enables any one user station to transmit information to any other or a plurality of other user stations.

DETAILED DESCRIPTION

Figure 1:
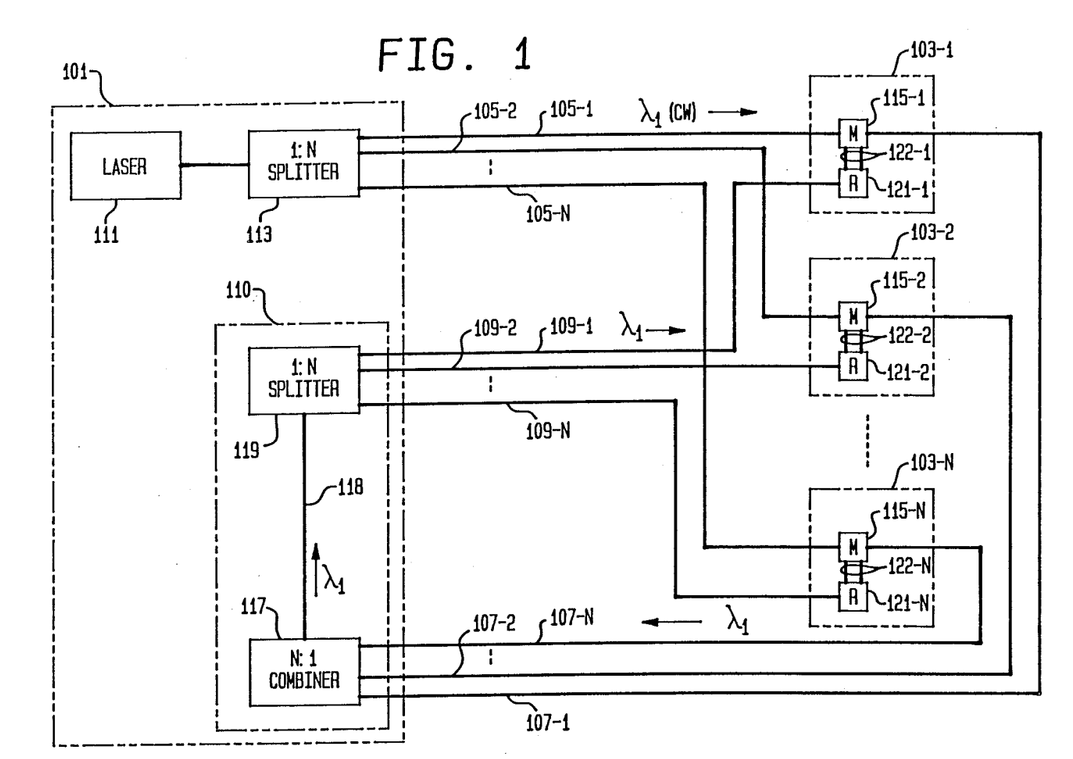
FIG. 1 shows a distributed star network implemented using single mode optical technology in accordance with an illustrative embodiment of the invention.

The distributed star network of FIG. 1 comprises central office 101 and user stations 103-1,103-2 . . . 103-N. The central office 101 and the user stations 103-1,103-2 . . . 103-N are connected by three sets of optical fibers. These are sets 105-1,105-2, . . . 105-N, 107-1,107-2, . . . 107-N and 109-1,109-2 . . . 109-N.

The central office 101 comprises a continuous wave laser source 111. The laser 111 produces a wavelength in the range of 1.3 micrometers to 1.5 micrometers. The laser 111 may advantageously be a wave length stabilized GaInAsP/InP laser such as the model QLM-1300-Sm-BH manufactured by Lasertron, Inc. of Burlington, MA.

The coherent radiation produced by the laser 111 is divided over the single mode optical fibers 105-1,105-2 . . . 105-N by means of the 1:N power divider 113. Illustratively the power divider 113 comprises a cascaded array of one-fiber-input to two-fiber-output directional couplers. An illustrative form of such a one-fiber-input to two-fiber-output coupler is manufactured by Gould, Inc., Defense Electronics Division and is described in their bulletin GD-11. Each of the fibers 105-1,105-2, . . . 105-N receives 1/N of the total power produced by the laser 111.

Each of the user stations 103-1,103-2, . . . 103-N includes an external modulator 115-1,115-2,115-N. The modulators 115-1,115-2, . . . 115-N are used to modulate information onto radiation transmitted over fibers 105-1,105-2,105-N. The radiation is then transmitted back to the central office 101 by means of fibers 107-1,107-2, . . . 107-N. Note as shown in FIG. 1, that each of the fibers 107-1,107-2, . . . 107-N is associated with one of the user stations 103-1,103-2, . . . 103-N, respectively.

In the central office 101 the signals transmitted over the optical fibers 107-1,107-2, . . . 107-N are combined by the N:1 combiner 117 which forms part of the hub element 110. The combiner 117 illustratively comprises a cascaded array two-fiber-input to one-fiber-output directional couplers.

The combined radiation from the combiner 117 is transmitted over the fiber 118 to a second 1:N splitter 119 which is illustratively similar in construction to the splitter 113 described above. The splitter 119 serves to divide the combined radiation coming from the combiner 117 over the optical fibers 109-1,109-2, . . . 109-N for retransmission back to the user stations 103-1,103-2, . . . 103-N. Illustratively each of the user stations includes a receiver 121-1,121-2, . . . 121-N for receiving radiation transmitted over fibers 109-1,109-2, . . . 109-N, respectively. Thus, information modulated on the radiation at any one of the user stations 103-1,103-2, . . . 103-N is optically rebroadcast to all of the user stations by means of the hub element 110.

The single mode optical distributed star network of FIG. 1 may be used as a packet switching network in which packets of information are exchanged between or among user stations in a point-to-point or broadcast manner. Conflicts between user stations wishing to simultaneously transmit information through the hub element 110 may be avoided through the use of a conventional packet switching protocol. Such protocols are used in other types of packet switching communications systems including satellite and radio communications systems. These protocols fall into one of three categories: random access protocols, fixed allocation protocols and demand assignment protocols and are discussed in Kleinrock (IEEE Trans Communications, 1973), Metcalfe (Comm. of the ACM July 1976) and Abramson (IEEE Trans Communications, January 1977).

A particularly simple approach for avoiding conflicts between user stations that wish to simultaneously transmit information is as follows. In each user station 103-1,103-2, . . . 103-N, the modulator 115-1,115-2, . . . 115-N is connected to the corresponding receiver 121-1,121-2, . . . 121-N by means of lines 122-1,122-2, . . . 122-N. No user station can actively modulate information on radiation transmitted thereto by the central office while its corresponding receiver is receiving information transmitted by another user station. This system works in the network of FIG. 1 because all of the receivers receive information transmitted from any one user station. Typically, each user station includes a buffer (not shown), so that information which cannot be immediately transmitted can be stored for later transmission.

The distributed star network of FIG. 1, is particularly useful, when it is used in the broadcast mode. The distributed star network connects any user station to all other user stations via a common communication medium. Thus, when combined with the features of packet switching, the resulting packet broadcast channel permits the elimination of complicated network routing and switching associated with traditional public switched networks.

Figure 2:
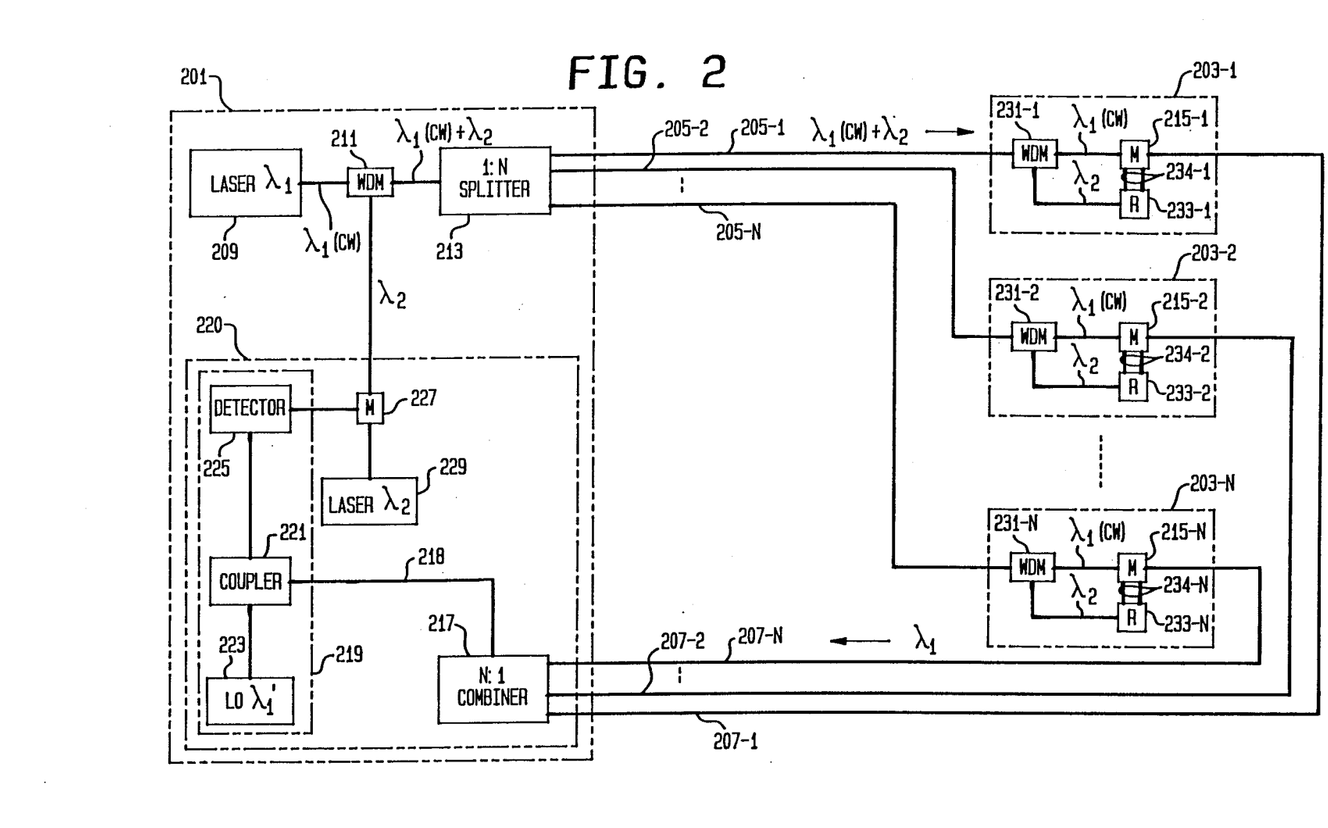
FIGS. 2 and 3 also show distributed star communications networks implemented using single mode optical technology in accordance with alternate embodiments of the invention.

Turning to FIG. 2, an alternative distributed star network implemented using single mode optical technology is illustrated. The network of FIG. 2 comprises central office 201 user stations 203-1,203-2, . . . 203-N. The user stations are connected to the central office 201 by two sets of optical fibers 205-1,205-2, . . . , 205-N, and 207-1,207-2, . . . 207-N. Thus, by use of the technology discussed below, one of the sets of optical fibers connecting the user stations and the central office of FIG. 1 is eliminated.

The central office 201 comprises a continuous wave laser source 209. The laser 209 produces wavelength $\lambda_1$ radiation in the range of 1.3 to 1.5 micrometers. The wavelength $\lambda_1$ radiation produced by the laser 209 is transmitted through the wavelength division multiplexer 211 to the 1:N power divider 213. The use of the wavelength division multiplexer 211 is discussed below. The 1:N power divider 213 divides the output of the laser 209 over the fibers 205-1,205-2, . . . 205-N for transmission to the central offices 203-1,203-2,203-N.

Each of the user stations 203-1,203-2, . . . 203-N includes a modulator 215-1,215-2, . . . 215-N. Each of the modulators 215-1,215-2, . . . 215-N can modulate information onto the radiation of wavelength $\lambda_1$ transmitted over the fibers 205-1,205-2, . . . 205-N. The wavelength $\lambda_1$ radiation is then transmitted from the user stations back to the central office 201 by means of optical fibers 207-1,207-2 . . . 207-N. The radiation transmitted back to the central office 201 is received therein by the hub element 220.

In the hub element 220, an N:1 combiner 217 receives the radiation transmitted over the fibers 207-1,207-2, . . . 207-N and combines the radiation received over the fibers 207-1,207-2, . . . 207-N into a single beam which is transmitted over fiber 218 to the heterodyne receiver 219. Illustratively the N to 1 combiner 217 comprises a cascaded array of two-fiber-input to one-fiber-output directional couplers.

The receiver 219 is an optical heterodyne receiver. Such optical heterdyne receivers are discussed in Yamamoto, IEEE J. of Quantum Electrons, Vol. AE-17, 1981. More particularly, the heterodyne receiver 219 includes a directional coupler 221 which receives the combined radiation from fiber 218 and radiation of wavelength $\lambda_1'$. The radiation of wavelength $\lambda_1'$ is produced by local oscillator 223. Illustratively the wavelengths $\lambda_1$ and $\lambda_1'$ are chosen so that their corresponding frequencies differ by the frequency of a radio frequency carrier. The detector 225 converts the optical signal emanating from the coupler 221 into an electronic signal and is used to suppress all frequencies components except the radio frequency carrier component which now carries the information modulated onto the wavelength $\lambda_1$ radiation at the user stations. The information modulated onto the radio frequency carrier as a result of the heterodyne detection process is converted through conventional techniques to baseband form and transmitted to the modulator 227.

The modulator 227 is used to modulate the wavelength $\lambda_2$ output of laser 229. Thus, through use of the heterodyne receiver 219, the modulator 227 and the laser 229, information modulated on wavelength $\lambda_1$ radiation at any of the user stations 203-1,203-2, . . . 203-N has been regenerated and remodulated onto wavelength $\lambda_2$ radiation in the central office 201. The modulated wavelength $\lambda_2$ radiation is then transmitted from the modulator 227 to the wavelength division multiplexor 211 where it is multiplexed with the unmodulated continuous wave wavelength $\lambda_1$ radiation from the laser 209. The modulated wavelength $\lambda_2$ radiation is processed by the beam splitter 213 along the unmodulated wavelength $\lambda_1$ radiation and transmitted over fibers 205-1,205-2, . . . 205-N, to the user stations 203-1,203-2, . . . 203-N.

Each of the user stations 203-1,203-2,203-N includes a wavelength division multiplexer 231-1,231-2, . . . 231-N. The wavelength division multiplexer located in each user station serves to separate the continuous wave wavelength $\lambda_1$ radiation produced by the laser 209 from the modulated wavelength $\lambda_2$ radiation produced by the laser 229 and modulated by the modulator 227. The unmodulated continuous wavelength $\lambda_1$ radiation is processed by the modulators 215-1,215-2, . . . 215-N while the modulated wavelength $\lambda_2$ radiation is received by the receivers 233-1,233-2, . . . 233-N. In the user stations 203-1,203-2, . . . 203-N, each of the modulators 215-1,215-2, . . . 215-N is in communication with the corresponding receiver 233-1,233-2, . . . 233-N by means of lines 234-1,234-2, . . . 234-N to prevent data collisions in the hub element 220 if two user stations try to transmit data to the hub element 220 at the same time.

Thus, in comparison to the system of FIG. 1, the system of FIG. 2 eliminates one set of optical fibers connecting the user stations with the central office but requires the added expense of a wavelength division multiplexer in each of the user stations 203-1,203-2, . . . 203-N. The use of coherent heterodyne detection in the hub element 220 can serve to increase receiver sensitivity 10-20 dB and, therefore, enable an increase in the number of user stations in the network. Instead of heterodyne detection, the radiation in single mode fibers 207-1, 207-2 . . . 207-N may be combined by a passive combiner whose output is connected to a multimode fiber. The multimode fiber is then connected to a conventional optical regenerator which drives the laser with $\lambda_2$ wavelength output.

Figure 3:
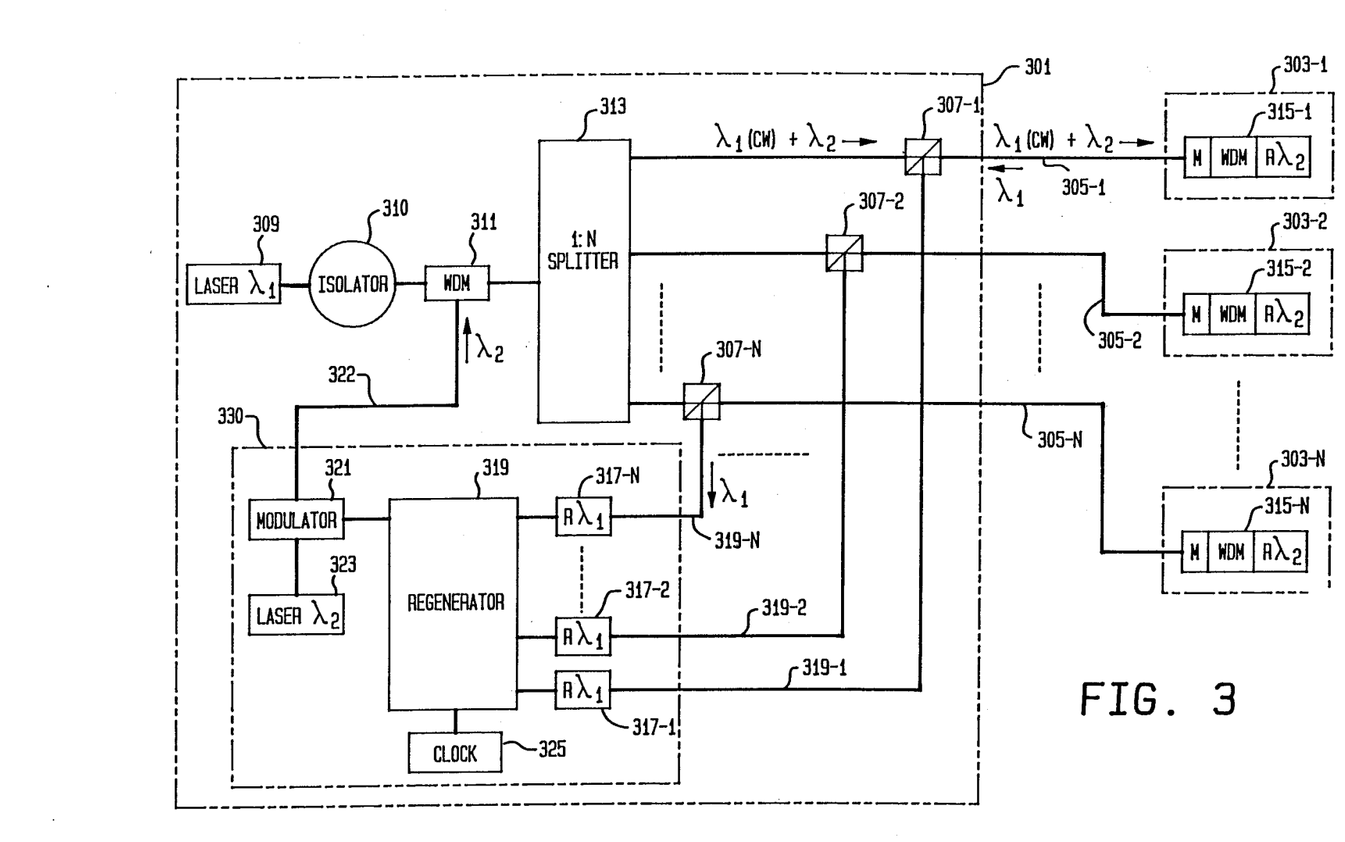

FIG. 3 shows another alternative embodiment of a distributed star network implemented using single mode optical technology. The network of FIG. 3 comprises a central office 301 and a plurality of user stations 303-1,303-2, . . . 303-N. The central office 301 and the user stations 303-1,303-2, . . . 303-N are connected by a single set of optical fibers 305-1,305-2, . . . 305-N. For reasons which are discussed below each of the optical fibers 305-1,305-2, . . . 305-N includes a beam splitter 307-1,307-2, . . . 307-N.

The central office 301 comprises a single mode continuous wave laser source 309. Illustratively, the laser 309 produces wavelength $\lambda_1$ radiation in the range of 1.3 to 1.5 microns. The unmodulated continuous wavelength $\lambda_1$ radiation from the laser 309 is transmitted through the the optical isolator 310, and the wavelength division multiplexer 311 to a 1:N power divider 313. The 1 to N power divider 313 divides the wavelength $\lambda_1$ radiation produced by the laser 309 over the fibers 305-1,305-2, . . . 305-N for transmission to the user station 303-1,303-2,303-N. The function of the optical isolator 310 and the wavelength division multiplexer 311 is discussed below.

Each of the user stations includes an integrated modulator/wavelength division multiplexer/receiver unit 315-1,315-2, . . . 3115-N. The unmodulated wavelength $\lambda_1$ radiation received at each user station 303-1,303-2, . . . 303-N may be modulated by means of a modulator incorporated in the corresponding integrated units 315-1,315-2, . . . 315-N. Through the use of the wavelength division multiplexer incorporated in each of the integrated units 315-1,315-2, . . . 315-N the wavelength $\lambda_1$ radiation is transmitted back to the central office 310 via the fibers 305-1,305-2, . . . 305-N. The beam splitters 307-1,307-2, . . . 307-N deflect a substantial portion of the wavelength $\lambda_1$ radiation being transmitted away from the user stations 303-1,303-2, . . . 303-N to the receivers 317-1,317-2, . . . 317-N which form part of the hub element 330. The optical isolator 310 isolates wavelength $\lambda_1$ radiation being trasmitted away from the user stations 303-1,303-2, . . . 303-N from the laser 309. Fibers 319-1,319-2, . . . 319-N are used to transmit the modulated wavelength $\lambda_1$ radiation from the beam splitters 307-1,307-2, . . . 307-N to the receivers 317-1,317-2, . . . 317-N. The receivers convert the modulated wavelength $\lambda_1$ radiation to electronic signals. Illustratively, each of the receivers 317-1,317-2, . . . 317-N has an automatic gain control which will guarantee that every incoming signal has substantially the same amplitude.

The regenerator circuit 319 is used to avoid collisions between user stations which try to simultaneously transmit information to the central hub element 330. For example, when one receiver is busy, the regenerator circuit may turn off idle receivers to avoid collisions in the hub element as suggested in "Star Network with Collision Avoidance Circuits", A. Albanese, Bell System Technical Journal, Vol. 63, pp. 631-638, March, 1983. In other words, the regenerator 319 employs a collision avoidance technique in which individual user stations obtain access to the hub 330 on a first come, first served basis. Individual user stations wishing to transmit information while the hub is busy either buffers the information for later transmission or else the information may be lost. Thus, the output of the regenerator circuit 319 comprises, at any one time, information transmitted by any one user station for rebroadcast by the hub element 330 to all user stations. In addition, the regenerator circuit 319 has a clock 325 coupled thereto.

The output signal of the regenerator circuit 319 is connected to a modulator 321 which is used to modulate the wavelength $\lambda_2$ output of laser 323. The wavelength $\lambda_2$ output of the laser 323 may also be modulated with the clock signal from clock 325 so that the clock signal can later be recovered at the user stations 303-1,303-2, . . . 303-N. The clock signal is utilized so that the network can be operated in a synchronous manner.

The modulated wavelength $\lambda_2$ radiation is transmitted over fiber 322 to the wavelength division multiplexor 311 where it is multiplexed with the unmodulated continuous wave wavelength $\lambda_1$ radiation from the laser 309. The wavelength $\lambda_2$ radiation is transmitted to the user station 303-1,303-2,303-N by means of the 1:N power divider 313 and the optical fibers 305-1,305-2, . . . 305-N.

The integrated units 315-1,315-2,315-N, at the user stations 303-1,303-2, . . . 303-N each include a wavelength division multiplexer for separating the arriving modulated wavelength $\lambda_2$ radiation and unmodulated continuous wave wavelength $\lambda_1$ radiation. The wavelength $\lambda_2$ radiation is detected by means of a detector sensitive to wavelength $\lambda_2$ radiation incorporated into each of the integrated units 315-1,315-2, . . . 315-N, while the unmodulated wavelength $\lambda_1$ radiation is modulated and retransmitted back to the central office 301.

In the embodiment of the invention shown in FIG. 3, collisions between user stations which try to simultaneously transmit information to the central hub element may be avoided by an alternate mechanism. Illustratively, each of the N user stations 303-1,303-2 . . . 303-N transmits information to the central hub at a maximum bit rate $f_1$. Thus, if the central hub can rebroadcast this information at the bit rate $Nf_1$ collisions cannot be expected to occur. In this case the regenerator circuit 319 and clock 325 operate the modulator 321 to modulate information on the wavelength $\lambda_2$ radiation from laser 323 at the rate $Nf_1$.

Thus, a distributed star network implemented in single mode optical technology which connects any user station to any other station or plurality of other user stations is disclosed. Note, that the embodiment of the invention shown in illustration FIG. 3 utilizes only a single set of fibers to connect the central office 301 and the user stations 303-1,303-2, . . . 303-N. This should be contrasted with the network of FIG. 1 which utilizes three sets of fibers and the network of FIG. 2 which utilizes two sets of fibers.

Figure 4:
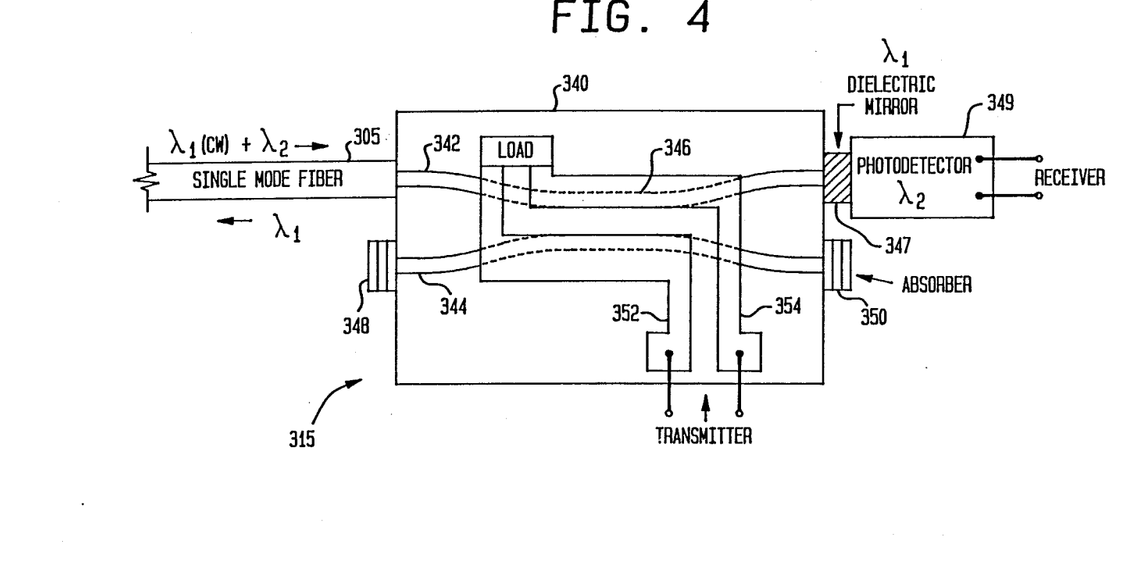
FIG. 4 shows an integrated modulator, detector, and wavelength division multiplexer for use in the network of FIG. 3. For purposes of clarity, the Figures have not been drawn to scale.

Turning to FIG. 4, an integrated unit 315 for use in one of the user stations 303-1,303-2, . . . 303-N of FIG. 3 is illustrated. The unit 315 of FIG. 4 combines in a single unit a wavelength selective modulator, a receiver and a wavelength division multiplexer. As indicated in connection with discussion of FIG. 3, the fiber 305 transmits unmodulated continuous wavelength $\lambda_1$ radiation and modulated wavelength $\lambda_2$ radiation to the unit 315 while simultaneously transmitting modulated wavelength $\lambda_2$ radiation away from the unit 315.

The integrated unit 315 comprises a body 340 which is illustratively formed from $LiNbO_3$. Inside the body 340 are two waveguides 342 and 344 which illustratively are close together near a central modulation region 346. The waveguides may be formed by the diffusion of titanium into the $LiNbO_3$ body. Continuous wave wavelength $\lambda_1$ radiation and modulated wavelength $\lambda_2$ radiation, enter the upper waveguide 342 from the fiber 305. The modulated wavelength $\lambda_2$ radiation propagates along the waveguide 342, is transmitted by the wavelength selective mirror 347 and is detected by the wavelength selective photodetector 349.

The conductors 352 and 354 are used to modulate the wavelength $\lambda_1$ radiation received from the fiber 305. Depending on the signal applied to the conductors 352 and 354, wavelength $\lambda_1$ radiation propagating in waveguide 342 will either (a) optically tunnel into waveguide 344 and be absorbed by absorbers 348 and 350, or (b) remain in waveguide 342.

In this meanner, the intensity of the continuous wave wavelength $\lambda_1$ radiation received from the fiber 305 is modulated with information. Note that the modulator portion of the integrated unit may advantageously be half the length or utilize roughly half the voltage of conventional modulators formed from optically coupled waveguides. The reason for this is that wavelength $\lambda_1$ radiation arriving on fiber 305 makes two passes through the modulation region before leaving in modulating form by way of fiber 305. Thus, the wavelength $\lambda_1$ selective dielectric mirror 347 is provided to reflect wavelength $\lambda_1$ radiation.

Preferably, $\lambda_1$ and $\lambda_2$ are chosen so that the modulation mechanism is wavelength selective (i.e., limited to wavelength $\lambda_1$ radiation).

Thus, an integrated modulator/wavelength division multiplexer/receiver unit 315 has been disclosed which is capable of (a) separating continuous wavelength $\lambda_1$ radiation from modulated wavelength $\lambda_2$ radiation, (b) detecting the wavelength $\lambda_2$ radiation, (c) modulating the wavelength $\lambda_1$ radiation and (d) retransmitting the wavelength $\lambda_1$ radiation over the same fiber that the unmodulated wavelength $\lambda_1$ and wavelength $\lambda_1$ radiation arrived on.

Finally, the above described embodiments of the invention are intended to be illustrative only. Numerous alternative embodiments may be devised by those skilled in the art without departing from the spirit and scope of the following claims.

What is claimed is:

1. A telecommunications network for providing communications among a plurality of user stations comprising:

continuous wave laser means for transmitting unmodulated coherent optical radiation to each of said user stations, said means for transmitting comprising at least one single mode optical fiber link to each of said user stations, means at each of said user stations capable of modulating information onto said radiation, and a hub element for receiving said radiation from all of said user stations and for optically broadcasting information received from any of said user stations by means of said radiation to all of said user stations, said hub element comprising a passive optical combiner for combining said radiation received from all of said user stations and a passive optical power divider for transmitting a fraction of the combined radiation formed by said combiner to all of said user stations.

2. The network of claim 1 wherein said combiner comprises a cascaded array of two-fiber-input to one-fiber-output directional couplers.

3. The network of claim 1, wherein said power divider comprises an array of one-fiber-input to two-fiber-output directional couplers.

4. A telecommunications network for providing communications among a plurality of user stations comprising:

means for transmitting unmodulated optical radiation of a preselected wavelength, $\lambda_1$, to each of said user stations, said means for transmitting comprising at least one fiber optic link to each of said user stations, means at each of said user stations capable of modulating information onto said radiation, and a hub element which comprises a passive optical combiner for combining said modulated wavelength $\lambda_1$ radiation received from all of said user stations, an optical heterodyne receiver for converting information encoded on said wavelength $\lambda_1$ radiation emanating from said combiner into an electrical signal, a source of a second pre-selected wavelength $\lambda_2$, radiation, modulator means for modulating said wavelength $\lambda_2$ radiation with said electrical signal, and means for transmitting said modulated wavelength $\lambda_2$ radiation to all of said user stations.

5. The network of claim 4 wherein said link includes a first set of optical fibers for transmitting said unmodulated wavelength $\lambda_1$ radiation and said modulated wavelength $\lambda_2$ radiation to said user stations, and a second set of optical fibers for transmitting said modulated wavelength $\lambda_1$ radiation from said user stations to said passive optical combiner.

6. A telecommunications network for providing communications among a plurality of user stations comprising:

means for transmitting unmodulated optical radiation of a first preselected wavelength, $\lambda_1$, to each of said user stations, said means for transmitting comprising at least one fiber optic link to each of said user stations, and said preselected wavelength being modulated at each said user station, and     a hub element for receiving said radiation from all of said user stations and for optically broadcasting information received from any of said user stations by means of said radiation to all of said user stations, and wherein said hub elements comprises     a set of individual receivers, each of said receivers in said set being adapted to receive said modulated wavelength $\lambda_1$ radiation from one of said user stations and to detect information encoded thereon,     a source of a second pre-selected wavelength, $\lambda_2$, radiation,     modulation means for modulating said wavelength $\lambda_2$ radiation with said detected information and     means for broadcasting said modulated wavelength $\lambda_2$ radiation to all of said user stations.

7. The network of claim 6 wherein said link includes a single set of optical fibers for transmitting said unmodulated wavelength $\lambda_1$ radiation to said user stations, for transmitting said modulated wavelength $\lambda_1$ radiation from said user stations to said set of receivers, and for transmitting said modulated wavelength $\lambda_2$ radiation to said user stations.

8. The network of claim 7 wherein each fiber in said set includes a beam splitter for directing said wavelength $\lambda_1$ radiation from one of said user stations to one of said receivers.

9. A hub element for use in an optical communications network providing communications among a plurality of user stations wherein at least one fiber optic link directly connects said hub element with each of said user stations, said hub elements comprising:

means for receiving information optically transmitted from any of said user stations via the corresponding one of said fiber optic links at a first pre-selected wavelength, $\lambda_1$, and     means for optically broadcasting said information received from any of said user stations to all of said user stations at a second pre-selected wavelength, $\lambda_2$, said hub including a heterodyne receiver for converting information modulated on said wavelength $\lambda_1$ radiation into an electrical signal, and a modulator for modulating said wavelength $\lambda_2$ radiation with said electrical signal.

10. A hub element for use in an optical communications network providing communications among a plurality of user stations wherein at least one fiber optic link directly connects said hub element with each of said user user stations, said hub element comprising:

means for receiving information optically transmitted from any of said user stations via the corresponding one of said fiber optic links, wherein a first preselected wavelength, $\lambda_1$, radiation is received by said hub element from said user stations and wherein a second pre-selected wavelength, $\lambda_2$, radiation is broadcast by said hub element to said user stations and wherein said receiving means comprises a set of individual receivers for receiving said wavelength $\lambda$ radiation, each of said receivers being optically connected to one of said user stations via said corresponding one of said links.

11. The hub element of claim 10 wherein said hub element further includes a modulator for modulating said wavelength $\lambda_2$ radiation with information received by way of said wavelength $\lambda_1$ radiation from any of said user stations.

12. An integrated modulator/wavelength division multiplexor/receiver unit comprising:

first and second optically coupled waveguides, said first waveguides being capable of receiving at one end continuous wave first pre-selected wavelength, $\lambda_1$, radiation and a second pre-selected wavelength, $\lambda_2$, radiation,     a wavelength selective mirror located at the other end of said first waveguide for transmitting said wavelength $\lambda_2$ radiation and reflecting said wavelength $\lambda_1$ radiation,     a detector for detecting said transmitted wavelength $\lambda_2$ radiation, and     means coupled to said first and second waveguides for selectively causing the tunneling of said wavelength $\lambda_1$ radiation from said first waveguide to said second waveguide, so as to modulate the intensity of said wavelength $\lambda_1$ radiation in said first waveguide, said modulated wavelength $\lambda_1$ radiations being transmitted from said one end of said first waveguide.

13. A device for modulating optical radiation comprising:

first and second optical waveguides, said first waveguide capable of receiving optical radiation at one end,     reflecting means located at the other end of said first waveguide for reflecting said radiation propagating therein, and     means coupled to said first and second waveguides for selectively causing the tunneling of said radiation from said first waveguide to said second waveguide, so as to modulate the intensity of said radiation in said first waveguide, said intensity modulated radiation being transmitted from said one end of said first waveguide.

* * * * *

UNITED STATES PATENT AND TRADEMARK OFFICE
CERTIFICATE OF CORRECTION

PATENT NO. : 4,712,859

DATED : December 15, 1987

INVENTOR(S) : Andres Albanese and Steven S. Cheng

It is certified that error appears in the above-identified patent and that said Letters Patent is hereby corrected as shown below:

Column 3, line 5, change "array two-" to -- array of two- --.
Column 4, line 34, change "heterdyne" to --heterodyne--.
Column 5, line 22, change "multiplexer in each" to --multiplexer in the central office 201 and a wavelength division multiplexer in each--;
Column 5, line 58, change "...3115-N" to --...315-N--;
Column 5, line 66, change "office 310" to --office 301--.
Column 7, line 25, change "$\lambda_2$" to --$\lambda_1$--;
Column 7, line 46, change "meanner" to --manner--.
Column 8, line 3, change "$\lambda_1$" to --$\lambda_2$--.
Column 9, line 14, change "elements" to --element--;
Column 9, line 41, change "elements" to --element--.
Column 10, line 12, change "$\lambda$" to --$\lambda_1$--;
Column 10, line 23, change "waveguides" to --waveguide--.

Signed and Sealed this

Twenty-fourth Day of July, 1990

Attest:

HARRY F. MANBECK, JR.

*Attesting Officer*   *Commissioner of Patents and Trademarks*